United States Patent [19]

Kondo et al.

[11] 4,432,428
[45] Feb. 21, 1984

[54] MOUNTING MECHANISM FOR A DIFFERENTIAL GEAR ASSEMBLY OF AN AUTOMOBILE

[75] Inventors: Toshiro Kondo; Kiyohiko Hamaoka, both of Hiroshima, Japan

[73] Assignee: Toyo Kogyo Co., Ltd., Hiroshima, Japan

[21] Appl. No.: 352,572

[22] Filed: Feb. 26, 1982

[30] Foreign Application Priority Data

Feb. 28, 1981 [JP] Japan .................................. 56-29010

[51] Int. Cl.³ .............................................. B60K 17/16
[52] U.S. Cl. ............................ 180/73 D; 180/73 TL
[58] Field of Search ....................... 180/70 R, 71, 73.1, 180/73.2, 73.3, 73.4, 73.5, 88, 73 R, 73 C, 73 D, 73 TT, 73 TL

[56] References Cited

U.S. PATENT DOCUMENTS 2,669,315  2/1954  Butterfield ............................ 180/71

FOREIGN PATENT DOCUMENTS 47-207  1/1972  Japan .
886372  1/1962  United Kingdom ............... 180/73.2

*Primary Examiner*—John A. Pekar
*Attorney, Agent, or Firm*—Fleit, Jacobson, Cohn & Price

[57] ABSTRACT

A differential gear mounting mechanism including a transversely extending sub-frame which carries the differential gear assembly through a bracket. The sub-frame is supported by the body at an end portion wherein the vertical reaction force caused by the driving torque is larger than in the other end portion through an oleo type damper and at the other end by a resilient rubber mount. The differential gear assembly is also supported by the body through a resilient rubber mount.

5 Claims, 9 Drawing Figures

MOUNTING MECHANISM FOR A DIFFERENTIAL GEAR ASSEMBLY OF AN AUTOMOBILE

The present invention relates to a mounting mechanism for a differential gear assembly of an automobile driving system. More particularly, the present invention relates a differential gear mounting mechanism for an automobile rear wheel drive system.

Conventionally, in an automobile rear wheel drive system, there is provided a transversely extending sub-frame having an intermediate portion attached with a differential gear assembly through a suitable bracket. At the opposite end portions, the sub-frame is further connected with suspension arms. Each of the suspension arms rotatably carries a rear wheel at one end thereof and, at the other end, it is pivotably attached to the sub-frame. The opposite end portions of the sub-frame are connected with a body frame of an automobile respectively through mounting rubbers. Further the differential gear assembly is also attached to the body frame through a rubber mount. In this type of mounting mechanism, the mounting rubbers provide a high lateral rigidity, however, they do not have sufficient ability of absorbing vertical vibrations. Further, in the conventional arrangement, there is a difficulty in balancing the reaction forces at the rubber mounts in the opposite end portions of the sub-frame. Speaking in more detail, at one end of the sub-frame, the reaction force due to the driving torque to the propeller shafts acts in the same direction at the reaction force due to the torque of the driving axle, whereas in the other end portion, the reaction forces act in the opposite directions. Thus, the one end of the sub-frame is always subjected to a substantially larger reaction force than the other end.

In order to eliminate adverse effects due to the unbalance between the reaction force at the opposite end portions of the sub-frame, Japanese patent application No. 46-38324 which has been filed on June 3, 1971 teaches to attach the differential gear assembly to the body through a rubber mount which is sidewardly offset from the longitudinal center line of the body. However, even with the proposed arrangement, it is impossible to provide a satisfactory ability of absorbing the vibrations in the vertical direction.

In order to increase the ability of absorbing the vertical vibrations, the rubber mounts may be substituted by fluid type damping means. However, simple substitution of the rubber mounts by fluid type damping means would cause a further problem because such type of damping means did not have a high transverse rigidity so that substantial rolling movements would be produced.

It is therefore an object of the present invention to provide a differential gear mounting mechanism which has a satisfactory ability of absorbing vertical vibrations simultaneously possessing a sufficiently high lateral rigidity.

Another object of the present invention is to provide a differential gear mounting mechanism in which reaction forces at the opposite side portions of the body can be balanced.

According to the present invention, the above and other objects can be accomplished by an automobile comprising a body, a sub-frame extending substantially transversely with respect to said body and having an intermediate portion and opposite end portions, differential gear means mounted on said sub-frame at the intermediate portion thereof and being connected with a propeller shaft and a pair of sidewardly extending driving axles so that a driving torque of the propeller shaft is transmitted through the differential gear means to said driving axles to produce driving torques for driving wheels which are respectively connected with said driving axles, suspension arms pivotably connected on one hand with said sub-frame respectively at the opposite end portion of said sub-frame and on the other hand with said wheels, a pair of mounts for connecting the respective end portions of the sub-frame to said body so that reaction forces against the driving torques in said propeller shaft and in said driving axles are produced at the mounts, one of said mounts is on the end portion of the sub-frame wherein said reaction force is greater than in the other end portion comprising fluid type damping means which has ability of absorbing relative vertical movement between said body and said sub-frame, the other mount including resilient support means.

According to the features of the present invention, it is possible to increase the ability of absorbing vertical vibrations while maintaining a sufficiently high lateral rigidity. Thus, it is possible to ensure a more comfortable riding and provide an improved stability.

The above and other objects and features of the present invention will become apparent from the following descriptions of a preferred embodiment taking reference to the accompanying drawings, in which.

Figure 1:
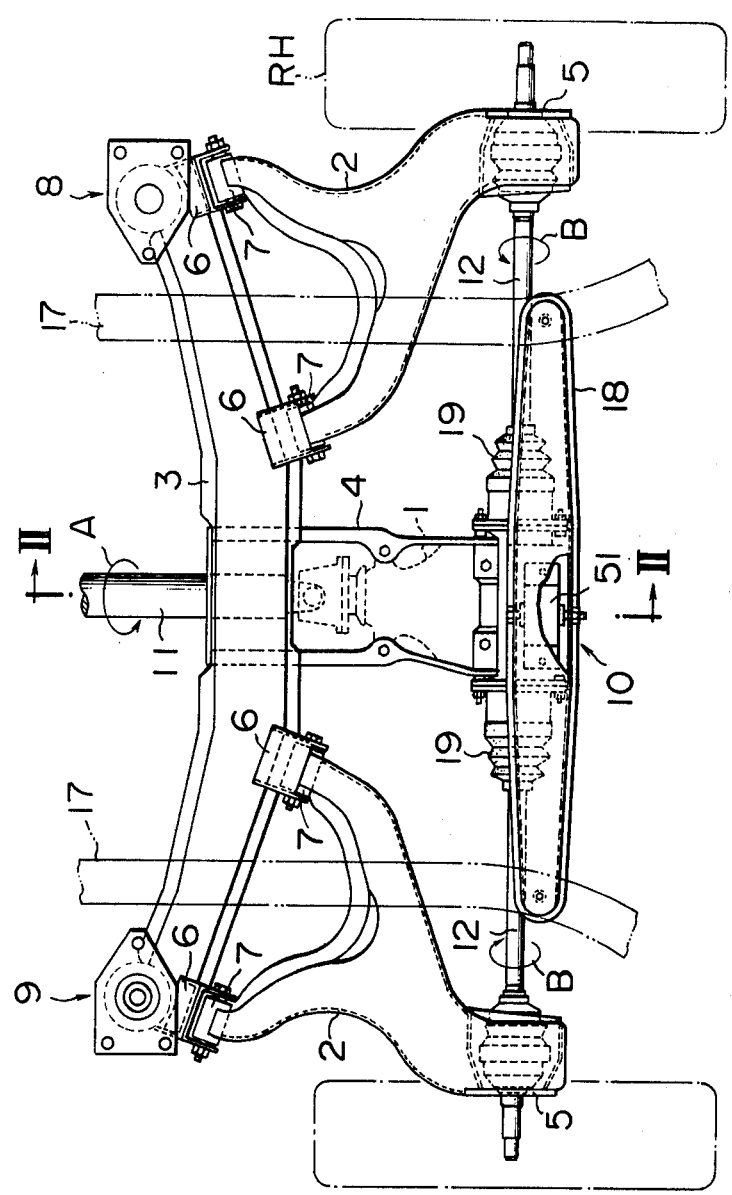
FIG. 1 is a plan view particularly showing the differential gear mounting mechanism in accordance with one embodiment of the present invention.
Figure 2:
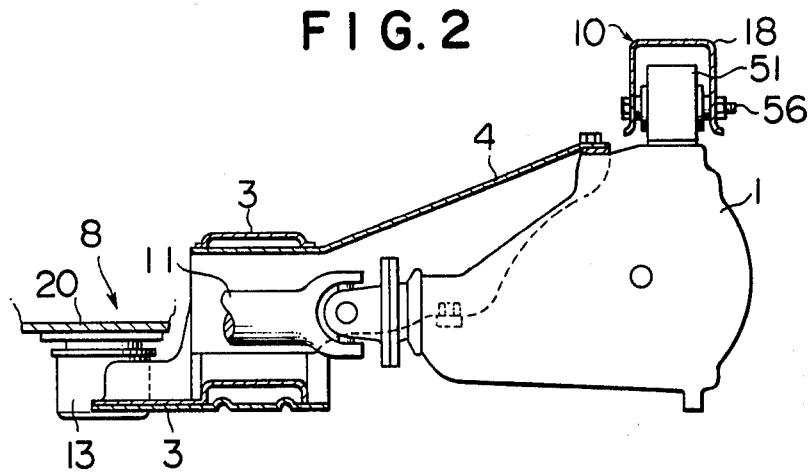
FIG. 2 is a sectional view taken substantially along the line II—II in FIG. 1.

Referring now to the drawings, particularly to FIGS. 1 and 2, the differential gear mounting structure shown therein includes a sub-frame 3 extending transversely with respect to a body which includes longitudinally extending side frames 17. A differential gear assembly 1 is mounted on the central portion of the sub-frame 3 through a mounting bracket 4. At the opposite end portions, the sub-frame 3 has suspension arms 2, each of which is pivotably connected at one end through a pair of rubber bushings 7 to brackets 6 provided on the sub-frame 3. The suspension arm 2 carries a driven wheel RH at the other end through a bearing 5.

The differential gear assembly 1 has an input member which is connected with a propeller shaft 11 which is adapted to be driven by an engine (not shown). The differential gear assembly 1 further has output members which are respectively connected with a pair of substantially transversely extending driving axles 12 which are connected with the wheels RH for driving the same. A flexible boot 19 is provided between the differential gear 1 and each driving axle 12 to protect the bearing for the axle.

Figure 3:
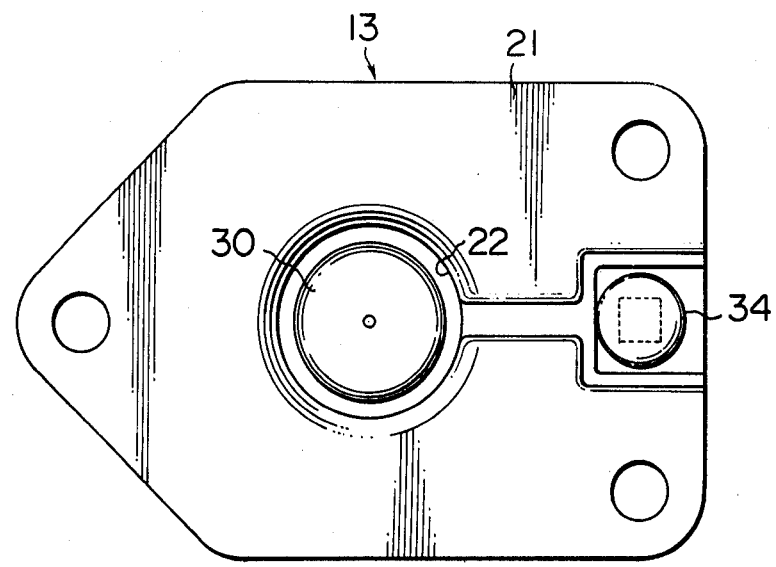
FIG. 3 is a plan view of the fluid type damper used in the mechanism shown in FIG. 1.
Figure 4:
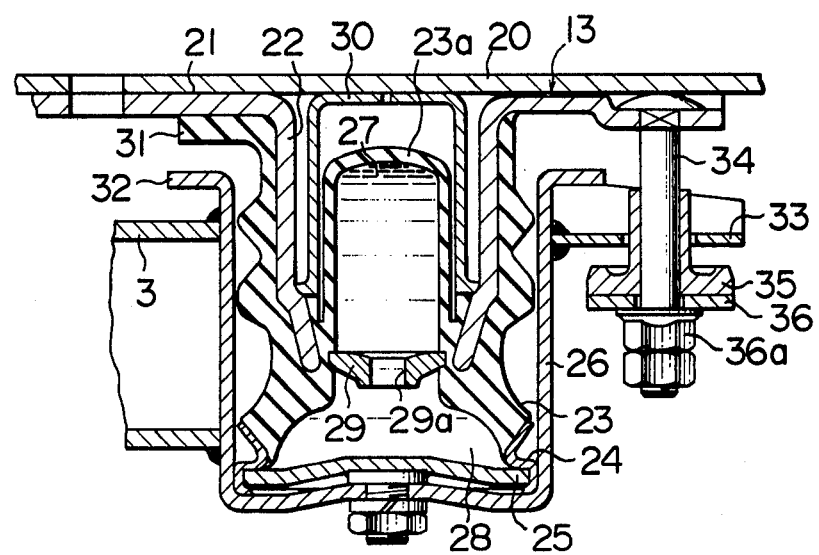
FIG. 4 is a sectional view of the damper shown in FIG. 3.

The body includes a cross member 18 which extends transversely between the side frames 17 and connected thereto. In order to mount the differential gear assembly 1 on the body, there are provided three mounting mechanisms 8, 9 and 10. The right side mounting mechanism 8 includes an oleo damper 13 which is shown in FIGS. 3 and 4. Supposing that the propeller shaft 11 is driven in the direction shown by an arrow A and the driving axles 12 as shown by arrows B, there is produced in the differential gear assembly 1 a reaction force which is a sum of the reaction force caused by the driving torque in the propeller shaft 11 and the reaction force caused by the reaction force transmitted from the wheels RH through the driving axles 12. The reaction force caused by the driving torque in the propeller shaft 11 tends to rotate the sub-frame 3 about the longitudinal axis of the body, whereas the reaction force caused by the reaction force transmitted from the wheels RH tends to lift the sub-frame 3. As the result, there is produced in the mounting mechanism 8 a reaction force which is a sum of the reaction force caused by the torque in the propeller shaft 11 and that caused by the torque in the right hand axle 12. The oleo damper 13 adopted in the mounting mechanism 8 has a sufficient ability to absorb any vertical movement caused by such a large reaction force.

Referring to FIGS. 3 and 4, the damper 13 includes a base plate 21 which is attached to a side member 20 of the body. The side member 20 may be a structural member which extends between and welded to the side member 17 and a side sill (not shown). The base plate 21 is formed at the central portion with a cylindrical portion 22 which extends downwardly. A rubber housing 23 is fitted to the outer surface of the cylindrical portion 22 and has a sealing plate 25 which is secured to the bottom end of the rubber housing 23 by means of a fitting ring 24. A cylindrical bracket 26 is secured to the sealing plate 25 and has an upper end portion welded to the right hand end of the sub-frame 3. The rubber housing 23 has an inner cylindrical portion 23a which is located in the cylindrical portion 22 of the base plate 21 and covered by a cap 30. In the rubber housing 23, there is disposed an orifice plate 29 having an orifice 29a to divide the inside cavity of the housing 23 into an upper chamber 27 and a lower chamber 28 which are communicated with each other only through the orifice 29a.

The rubber housing 23 is formed at the upper end portion with an outwardly extending flange 21 which is adapted to be engaged with a flange 32 formed in the upper end of the bracket 26 to provide an upper stopper mechanism. The cylindrical bracket 26 further has a stopper plate 33 extending radially outwardly from the outer surface thereof. The stopper plate 33 has an aperture 33a through which a bolt 34 extends. The bolt 34 is secured at the upper end to the base plate 21 and carried a rubber stopper 35 which is attached to the lower end portion of the bolt 34 through a washer 36 and nuts 36a. The stopper 35 is adapted to be engaged with the stopper plate 33 upon downward movement of the cylindrical bracket 26 to constitute a lower stopper mechanism.

The inside cavity of the rubber housing is filled with hydraulic oil. As the sub-frame 3 moves upwards with respect to the side member 20 of the body, the rubber housing 23 is axially collapsed so that the hydraulic oil in the lower chamber 28 is forced to flow through the orifice 29a. In this instance, the inner cylindrical portion 23a is resiliently expanded to admit the hydraulic oil from the chamber 28 into the chamber 27. The stopper mechanism comprised of the flanges 31 and 32 limits the upward movement of the sub-frame 3. When the sub-frame 3 is moved downwards with respect to the side member 20 of the body, the hydraulic oil is moved from the upper chamber 27 to the lower chamber 28. The stopper mechanism comprised of the members 33 and 35 limits the downward movement of the sub-frame 3. Thus, it will be understood that the oleo damper 13 provides an ability of absorbing vertical vibrations.

Figure 5:
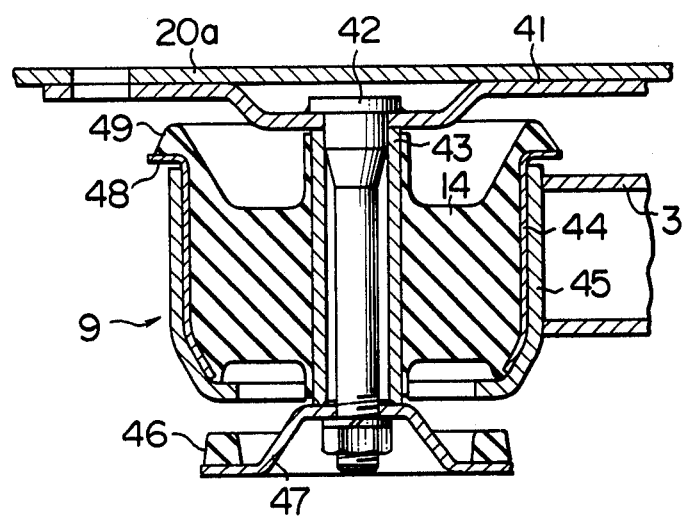
FIG. 5 is a sectional view of a rubber mount.

FIG. 5 shows the detail of the mounting mechanism 9 at the left side end of the sub-frame 3. The mounting mechanism 9 includes a base plate 41 adapted to be secured to a left side member 20a which is similar to the side member 20. A mounting bolt 42 is welded at the head end to the center portion of the base plate 41 and extends downwards therefrom. The mounting bolt 43 carries an inner tube 43 which is fitted thereto. An outer tube 44 is provided with a mount rubber 14 interposed between the inner tube 43 and the outer tube 44. The outer tube 44 is carried by a bracket 45 which is welded to the left hand end of the sub-frame 3. At the lower end of the bolt 42, there is provided a rubber stopper 46 which is carried by a disc 47 secured to the bolt 42 by means of a nut. The outer tube 44 is formed at the upper end with a flange 48 on which a rubber stopper 49 is provided. The rubber stopper 46 is adapted to be engaged with the bottom end of the bracket 45 upon downward movement of the sub-frame 3 whereas the stopper rubber 49 is adapted to be engaged with the base plate 41 upon upward movement of the sub-frame 3 so as to limit the vertical movements of the sub-frame 3.

Figure 6:
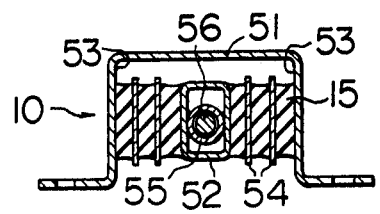
FIG. 6 is a sectional view of a rubber mount which may be used between the differential gear assembly and the body.

Referring to FIG. 6 which shows the mounting mechanism 10 between the differential gear assembly 1 and the cross member 18. The mounting mechanism 1 includes a bracket 51 which is secured to the upper surface of the differential gear assembly. The bracket 51 is of an inverted channel shaped cross-section and in the bracket 51 there is disposed a hollow member 52 of a rectangular cross-section. The rectangular member 52 is connected with the inner surfaces 53 of the bracket 51 through mount rubber assemblies including a plurality of mounting rubbers 15 with plates 54 interposed therebetween. A pipe member 55 is welded to the rectangular member 52 and secured to the cross-member 18 by means of a bolt 56.

In the structure described above, the right hand end portion of the sub-frame 3 is mounted on the body member through the mounting mechanism 8 including the oleo damper 13. Therefore, it is possible to absorb vibrations which may otherwise be transmitted to the body in abrupt starting and stopping of the automobile. Further, the rubber mount structures in the mounting mechanisms 9 and 10 provide a sufficient lateral rigidity sufficient to resist lateral forces which may be produced in turning operation of the automobile and the like.

Figure 7:
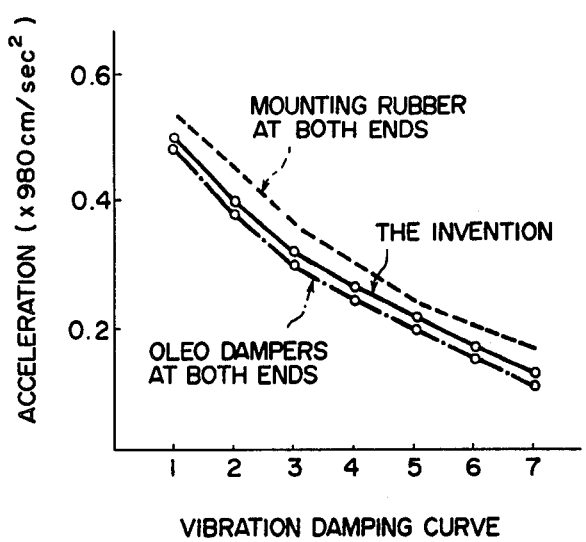
FIG. 7 is a diagram showing the damping characteristics of vibrations in the longitudinal direction.
Figure 8:
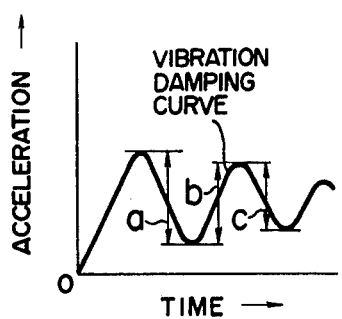
FIG. 8 shows a vibration damping curve.

FIGS. 7 and 8 show the effects of the present invention. In FIG. 7, there is shown longitudinal vibrations which are produced when the automobiles are accelerated with the second gear of the transmission from the engine speed of 1500 rpm. In the abscissa, there is shown the number of vibrations. Referring to FIG. 8, the displacement a from the first peak to the first bottom is counted as the first one, the displacement b from the first bottom to the second peak as the second one and the displacement c from the second peak to the second bottom as the third one. It is considered that the longitudinal vibrations shown in FIG. 7 have close relationship with the vertical vibrations discussed here. Therefore, it will be noted in FIG. 7 that the best result can be obtained when the sub-frame is mounted at the opposite ends by oleo dampers. However, the arrangement of the present invention shows a satisfactory result in respect of suspression of vibrations.

Figure 9:
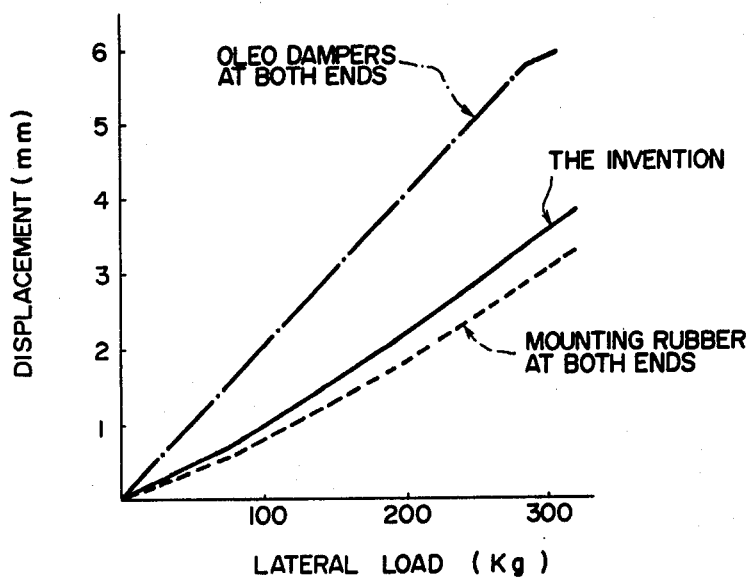
FIG. 9 is a diagram showing the relationship between lateral displacements and lateral loads.

FIG. 9 shows lateral displacements with respect to lateral loads. It will be noted that the best result can be obtained when the sub-frame is mounted at the opposite ends by rubber mounts. In the arrangement where the sub-frame is mounted oleo dampers, there will be unacceptably large lateral displacement. However, in the arrangement of the present invention, the lateral displacement can be suppressed within an acceptable range. Thus, the present invention provides satisfactory results in respect of both the suppressions of vibrations and the lateral displacements.

The invention has thus been shown and described with reference to a specific embodiment, however, it should be noted that the invention is in no way limited to the details of the illustrated structures but changes and modifications may be made without departing from the scope of the appended claims. For example, in the illustrated arrangement, the differential gear assembly 1 is supported by the bracket 4 extending rearwardly from the sub-frame 3. However, the differential gear assembly may be mounted on a forwardly extending bracket. The damper may not be of an oleo type but an air or gas damper may also be used.

We claim:

1. A differential gear mounting structure for an automobile comprising a body, a sub-frame extending substantially transversely with respect to said body and having an intermediate portion and opposite end portions, said mounting structure including means for mounting differential gear means on said sub-frame at the intermediate portion thereof, said differential gear means being connected with a propeller shaft and a pair of sidewardly extending driving axles so that a driving torque of the propeller shaft is transmitted through the differential gear means to said driving axles to produce driving torque for driving wheels which are respectively connected with said driving axles, suspension arms pivotably connected at one end portion with said sub-frame respectively at the opposite end portions of said sub-frame and at the other end portion with said wheels, a pair of mounts for connecting the respective end portions of the sub-frame to said body so that reaction forces against the driving torques in said propeller shaft and in said driving axles are produced at the mounts, one of said mounts which is on the end portion of the sub-frame wherein said reaction force is greater than in the other end portion comprising fluid type damping means which has ability of absorbing relative vertical movement between said body and said sub-frame, the other mount including resilient support means.

2. A differential gear mounting structure for an automobile in accordance with claim 1 in which said differential gear means is mounted on bracket means extending rearwardly from said sub-frame and supported by the body.

3. A differential gear mounting structure for an automobile in accordance with claim 1 in which said fluid type damping means includes a pair of chambers of which volumes are changed in response to a relative vertical movement between said body and said sub-frame, said chambers being filled with liquid, orifice means provided between said chambers so that the liquid is forced to pass through said orifice means upon changes in volumes of said chambers.

4. A differential gear mounting structure for an automobile in accordance with claim 1 in which said resilient supporting means includes an inner tube, an outer tube encircling said inner tube, a resilient material between said inner and outer tubes, said outer and inner tubes having longitudinal axes which are arranged substantially vertically, one of said inner and outer tubes being connected with said sub-frame and the other with said body so that a lateral movement of the sub-frame with respect to the body is resisted by a compression of the resilient material and a vertical movement by a shear of the resilient material.

5. A differential gear mounting structure for an automobile in accordance with claim 2 in which said differential gear means is supported by the body through resilient supporting means.

* * * * *